United States Patent
Chouard et al.

(10) Patent No.: US 9,522,739 B2
(45) Date of Patent: Dec. 20, 2016

(54) UNDUCTED PROPELLER GAS TURBINE ENGINE ATTACHMENT STRUCTURE

(75) Inventors: Pierre-Alain Jean-Marie Philippe Hugues Chouard, Melun (FR); Thomas Alain Christian Vincent, Palaiseau (FR)

(73) Assignee: SNECMA, Paris (FR)

(*) Notice: Subject to any disclaimer, the term of this patent is extended or adjusted under 35 U.S.C. 154(b) by 373 days.

(21) Appl. No.: 14/128,799

(22) PCT Filed: Jun. 13, 2012

(86) PCT No.: PCT/FR2012/051320
§ 371 (c)(1),
(2), (4) Date: Dec. 23, 2013

(87) PCT Pub. No.: WO2012/175843
PCT Pub. Date: Dec. 27, 2012

(65) Prior Publication Data
US 2014/0130512 A1    May 15, 2014

(30) Foreign Application Priority Data
Jun. 23, 2011    (FR) .................... 11 55572

(51) Int. Cl.
*F02C 7/20* (2006.01)
*B64D 27/26* (2006.01)
(Continued)

(52) U.S. Cl.
CPC ........... *B64D 27/26* (2013.01); *B64D 27/14* (2013.01); *B64D 2027/005* (2013.01);
(Continued)

(58) Field of Classification Search
CPC ......... B64D 27/14; B64D 27/18; B64D 27/26; B64D 2027/005; B64D 2027/262; B64D 2027/264
See application file for complete search history.

(56) References Cited

U.S. PATENT DOCUMENTS 4,821,980 A * 4/1989 Clausen ................ B64D 27/26
244/54
4,854,525 A * 8/1989 Chee .................... B64D 27/18
244/54
(Continued)

FOREIGN PATENT DOCUMENTS

CA    2 768 085 A1    2/2011
EP    0 761 945        3/1997
(Continued)

OTHER PUBLICATIONS

International Search Report Issued Nov. 26, 2012 in PCT/FR12/051320 Filed Jun. 13, 2012.

*Primary Examiner* — Lorne Meade
(74) *Attorney, Agent, or Firm* — Oblon, McClelland, Maier & Neustadt, L.L.P.

(57) ABSTRACT

An attachment structure for attaching a power plant including unducted propellers to a fuselage of an aircraft, the attachment structure being connected by first and second fasteners to respective front and rear spars penetrating into the fuselage and fastened to a carrier structure of the aircraft, and including a central longitudinal beam secured at its front end to a first frame, arranged in the plane of the front spar, that is secured at its rear end to a second rear frame, cantilevered out and arranged upstream from the unducted propellers, and that is secured to a third intermediate frame, arranged in the plane of the rear spar between the first and second frames. The first, second, and third frames are connected together by force-takeup beams, an assembly as
(Continued)

constituted in this way forming a cradle for receiving the power plant via a standard attachment.

10 Claims, 3 Drawing Sheets

(51) Int. Cl.
 *B64D 27/14* (2006.01)
 *B64D 27/02* (2006.01)
 *B64D 27/00* (2006.01)
(52) U.S. Cl.
 CPC .. *B64D 2027/026* (2013.01); *B64D 2027/262* (2013.01); *B64D 2027/264* (2013.01); *Y02T 50/44* (2013.01); *Y02T 50/66* (2013.01)

(56) References Cited

U.S. PATENT DOCUMENTS

| | | | | |
|---|---|---|---|---|
| 4,875,655 A | * | 10/1989 | Bender | F02C 7/20 244/54 |
| 5,064,144 A | * | 11/1991 | Chee | B64D 27/20 244/54 |
| 5,443,229 A | * | 8/1995 | O'Brien | B64D 27/20 244/54 |
| 5,806,792 A | | 9/1998 | Brossier et al. | |
| 7,159,819 B2 | * | 1/2007 | Machado | B64D 27/12 244/54 |
| 7,726,602 B2 | * | 6/2010 | Llamas Sandin | B64D 27/26 244/54 |
| 7,815,145 B2 | * | 10/2010 | Beardsley | B64D 27/26 244/54 |
| 8,439,300 B2 | * | 5/2013 | Lafont | B64D 27/14 244/54 |
| 8,444,085 B2 | * | 5/2013 | Stretton | B64D 27/12 244/54 |
| 8,517,304 B2 | * | 8/2013 | Journade | B64C 11/48 244/54 |
| 8,561,940 B2 | * | 10/2013 | Lisiewicz | B64D 27/14 244/54 |
| 8,640,987 B2 | * | 2/2014 | Journade | B64D 27/18 244/54 |
| 8,651,416 B2 | * | 2/2014 | Journade | B64D 27/18 244/54 |
| 2011/0079679 A1 | | 4/2011 | Journade et al. | |
| 2011/0139925 A1 | | 6/2011 | Lisiewicz et al. | |
| 2011/0233326 A1 | | 9/2011 | Lafont | |

FOREIGN PATENT DOCUMENTS

| | | |
|---|---|---|
| EP | 2 332 834 | 6/2011 |
| FR | 2 935 953 | 3/2010 |

* cited by examiner

UNDUCTED PROPELLER GAS TURBINE ENGINE ATTACHMENT STRUCTURE

BACKGROUND OF THE INVENTION

The present invention relates to the field of aviation and it relates more particularly to an attachment structure for unducted pusher propellers.

In conventional manner, aircraft power plants are housed in nacelles that can be arranged at various locations on the aircraft, on or under a wing, or indeed on the rear fuselage, the connection between the power plant and the corresponding portion of the aircraft taking place via an attachment structure of the pylon or mast type, as in patent application EP 0 761 945. Within the power plant, the gas generator forms the upstream portion of the turbine engine.

Nevertheless, when the nacelle is to receive a power plant having a single unducted propeller or a power plant having two unducted propellers (also known as an open rotor) presenting considerable weight that is cantilevered out, the attachment structure needs to satisfy specific constraints. A conventional solution for such attachment is thus to have recourse to an isostatic lattice of links. Unfortunately, such a structure is not without drawbacks, in particular because of its large size that generates a large amount of wake from the mast that impinges on the propellers.

OBJECT AND SUMMARY OF THE INVENTION

The present invention thus proposes a novel structure for attaching a turbine engine, the structure being of design that makes it possible to satisfy constraints specific to aircraft having unducted pusher propellers. An object of the invention is also to provide an attachment structure that modifies the paths for the forces exerted on the power plant in comparison with a conventional structure, and that makes it possible to optimize aerodynamic performance.

These objects are achieved by an attachment structure for attaching a power plant having unducted propellers to the fuselage of an aircraft, said attachment structure being connected by first and second fastener means to respective "front" and "rear" spars penetrating into the fuselage and fastened to the carrier structure of the aircraft, the attachment structure being characterized in that it includes a central longitudinal beam that is secured at its front end to a first frame, or "front" frame, arranged in the plane of said front spar, that is secured at its rear end to a second frame, or "rear" frame, cantilevered out and arranged upstream from said unducted propellers, and that is secured to a third frame, or "intermediate" frame, arranged in the plane of said rear spar between the first and second frames, and in that said first, second, and third frames are connected together by force-takeup beams, the assembly as constituted in this way forming a cradle for receiving the power plant via standard attachment means.

Thus, having recourse to a cradle makes it possible to carry considerable cantilevered-out weight while reducing the bending moment on the gas generator of the power plant.

Preferably, said central longitudinal beam is of varying width, being wider upstream and narrower downstream. Thus, the streamlines of the rear portion of the pylon surrounding the spars can be smoothed so as to diminish the impact on efficiency and propeller noise.

Advantageously, said first fastener means comprise two conical projections arranged on either side of the midplane of the power plant, and said second fastener means comprise a lug arranged in the midplane of the power plant.

Preferably, said conical projections and said lug include flexible pads for attenuating the vibration of the power plant.

In the embodiment envisaged, said standard attachment means for attaching the power plant to the cradle may comprise at least two suspension links fastened to said front frame on either side of the midplane of the power plant, and a plurality of flexible pads regularly distributed along said rear frame or indeed a first plurality of flexible pads regularly distributed along said front frame and a second plurality of flexible pads regularly distributed around said rear frame.

Advantageously, said cradle presents an asymmetrical structure with a central longitudinal beam offset by a determined angle to compensate for the angle of inclination of said spars relative to the horizontal.

The invention also provides an aircraft having unducted propellers including at least one power plant attached to its fuselage by an attachment structure as specified above.

BRIEF DESCRIPTION OF THE DRAWINGS

Other characteristics and advantages of the invention are described in greater detail on reading the following description of embodiments of the invention given with reference to the accompanying drawings, in which.

DETAILED DESCRIPTION OF THE INVENTION

Figure 1:
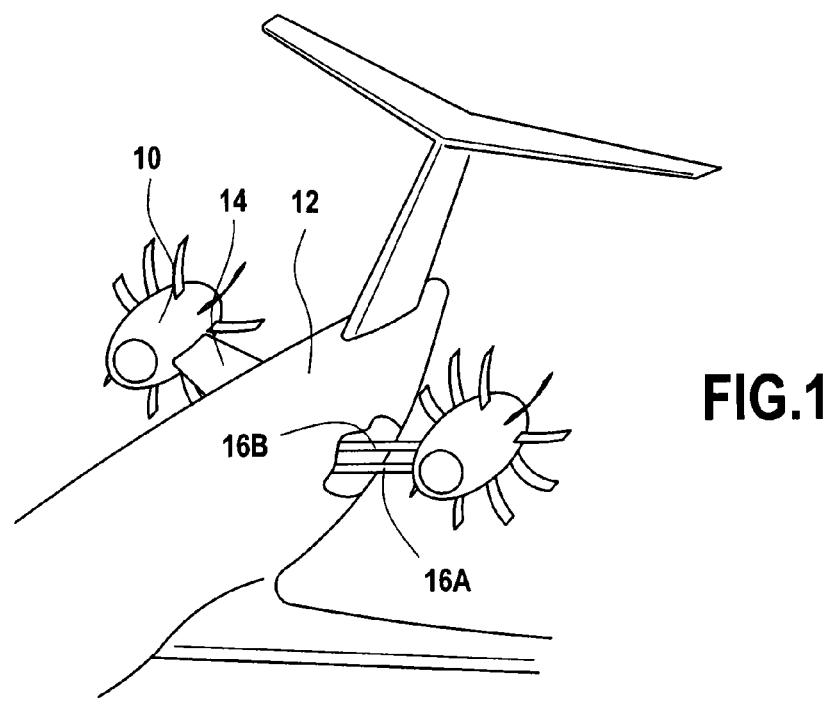
FIG. 1 is a general view of the rear portion of an aircraft fuselage having single unducted pusher propellers.

FIG. 1 is a diagram showing the rear portion of an aircraft having unducted pusher propellers, the nacelle 10 that surrounds and protects the power plant of the aircraft (an assembly forming that which is commonly called a "turboprop") is suspended from the fuselage 10 by a connection mast or pylon 14 that extends optionally substantially perpendicularly to the surface of the fuselage and that conventionally has two spars 16A, 16B that penetrate into the fuselage and that are fastened at one end to the carrier structure of the aircraft.

Figure 2:
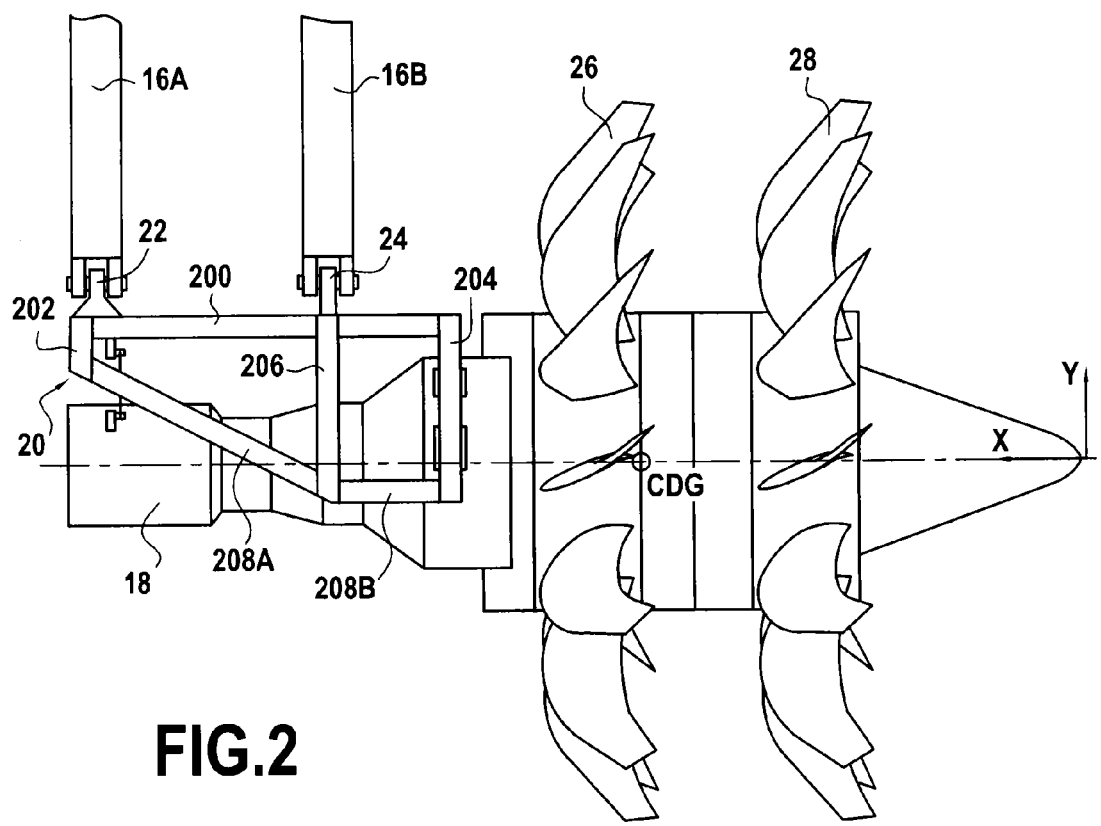
FIG. 2 is a diagrammatic view of an attachment structure of the invention.

In the invention, and as shown in FIG. 2, the other ends of these spars, which are for receiving the power plant 18, are fastened to a cradle 20 that is connected to the front and rear spars 16A and 16B via respective first and second fastener means 22 and 24. This cradle attachment structure includes a central longitudinal beam 200 that is secured firstly at its front end to a first frame, or "front" frame 202, arranged in the same plane as the front spar 16A, and is secured secondly at its rear end to a second frame, or "rear" frame 204, that is cantilevered out and arranged in front of or upstream from a first unducted pusher propeller 26 of the power plant (which propeller, in the non-limiting example shown, is followed by a second propeller 28 rotating in the opposite direction).

Advantageously, the central longitudinal beam 200 is also secured to a third frame, or "intermediate" frame 206, arranged in the same plane as the rear spar 16B, between the first and second frames. In order to enable forces to be taken up in the structure and in order to increase their second moments of area, the first, second, and third frames are of respective horseshoe-like shapes and they are connected to one another by lateral longitudinal beams 208A, 208B; 210A, 210B, or by crossbeams (not shown in the figure).

Figures 3A, 3B, 3C:
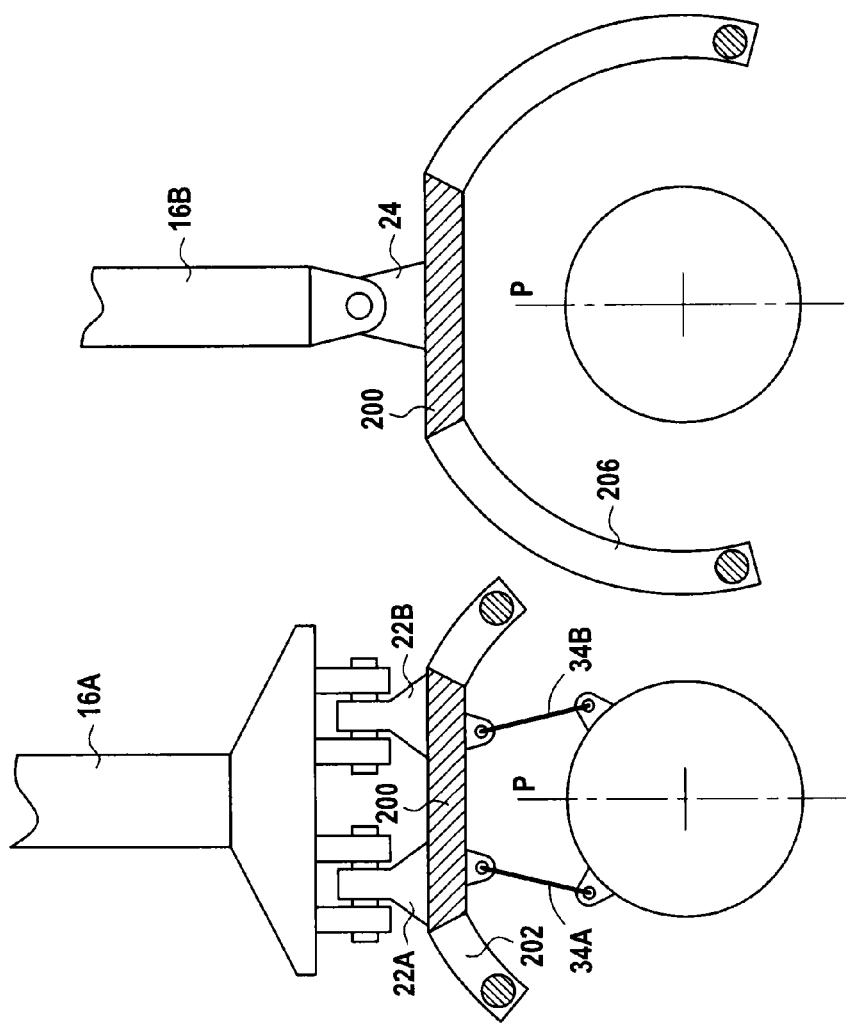
FIGS. 3A, 3B, and 3C are views on three different successive planes showing the attachment structure of FIG. 2.
Figure 4:
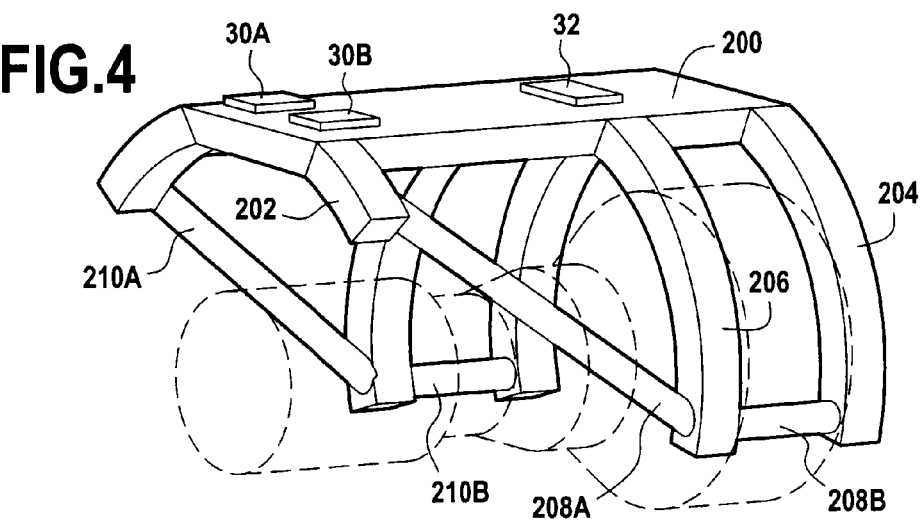
FIG. 4 is a diagrammatic perspective view of the cradle forming the central portion of the attachment structure of the invention.

As shown in FIG. 3A, the first fastener means for fastening the cradle to the front spar 16A (which for this purpose terminates in a T-shape) comprise two conventional conical projections 22A, 22B (such as those described in the usual mechanical design manuals for aviation) arranged on either side of the midplane P of the power plant. These conical projections may be mounted on flexible pads 30A, 30B (see FIG. 4) fastened on the central beam 200 in order to attenuate the vibration of the power plant. Naturally, fastening by more than two projections can also be envisaged. These conical projections take up forces in three dimensions.

Figure 4A:
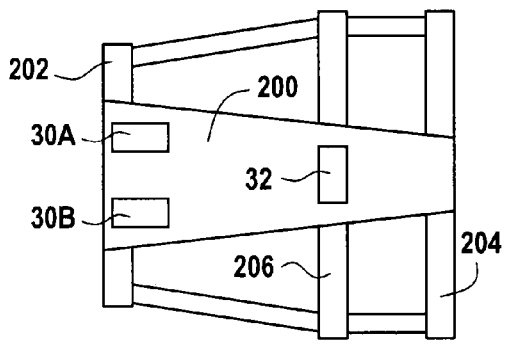
FIG. 4A is a plan view of the cradle in an alternative embodiment.

As shown in FIG. 3B, the second fastener means for fastening the cradle to the rear spar 16B merely comprise a lug 24 arranged in the midplane P of the power plant, and, like the conical projections, this lug may be mounted on a flexible pad 32 (see FIG. 4) likewise fastened on the central longitudinal beam 200 in order to attenuate the vibration of the power plant. The advantage of having only a single lug is to make it possible, if necessary, to reduce the width of the longitudinal beam at its rear end (see the embodiment of FIG. 4A) so that the beam presents varying width, being wider upstream and narrower downstream, thus helping to make the structure more compact upstream from the propellers.

The power plant is conventionally fastened to the cradle by standard attachment means formed firstly by two suspension links 34A, 34B fastened to the central longitudinal beam 200 in the plane of the front spar 16A, substantially level with the front frame 202, on either side of the midplane P of the power plant, and secondly by a plurality of flexible pads 36A-36D regularly distributed around the rear frame 204 (see FIG. 3C). In an alternative embodiment, the suspension links may also be replaced by flexible pads (not shown).

Figure 5:
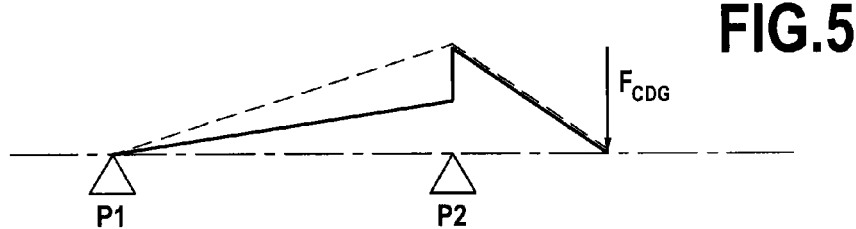
FIG. 5 is a diagram plotting the bending moment in the engine beam.

Thus, the cradle is mechanically connected with the power plant in the plane of the front spar and in the rear plane of the gas generator, upstream from the propellers. By means of this connection, the cradle takes up forces Fy and Fz at the front and forces Fx, Fy, and Fz at the rear together with a moment Mx (which is small in normal operation but which can become large in the event of a failure), the bending moment being taken up in part by the flexible pads and by the suspension links (or by the other flexible pads in the above-mentioned alternative embodiment). FIG. 5 is a simplified diagram of the bending moment in the engine beam subjected to one g vertically with and without the structure of the invention ("with" plotted in continuous lines, "without" plotted in dashed lines, and $F_{CDG}$ is the weight of the power plant). It can be seen that this bending moment is thus reduced between the front spar plane P1 and the rear engine plane P2. By acting on the ratio of the stiffnesses of the front and rear planes, the structure of the invention makes it possible to obtain a better distribution of loads among the various normal stages of flight. In addition, under limiting and ultimate load, coming into abutment of the elements changes the distribution of forces so as to pass more load in the engine beam and less in the cradle. Under such circumstances, the attachment structure of the invention can be lighter than a conventional isostatic structure.

Figure 6A:
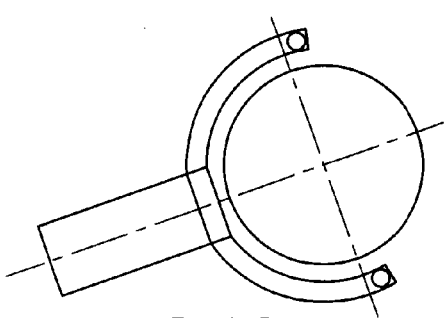
FIGS. 6A and 6B show two different possible example positions for the cradle.
Figure 6B:
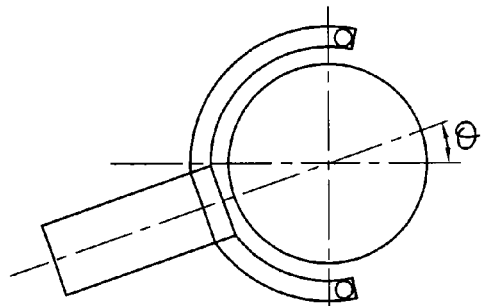

Depending on the arrangement of the turboprops on the aircraft, and as shown respectively in FIGS. 6A and 6B, the cradle may present a structure that is perfectly symmetrical or that is asymmetrical, with a central longitudinal beam 200 that is offset by a determined angle θ in order to compensate for the corresponding angle of inclination of the spars 16A, 16B relative to the horizontal. It is thus possible to maintain perfect symmetry between the left and right engines so as to enable them to be interchangeable.

It should be observed that lugs (not shown) with pins mounted with clearance may also be installed between the cradle and the carrier structure of the aircraft, between the front and rear spars, so as to constitute a force transmission path that is activated in the event of a spar breaking.

It should also be observed that although the invention is described above essentially with reference to an aircraft having unducted pusher propellers, it is clear that the invention is also applicable to an aircraft with unducted tractor propellers on the rear fuselage, or preferably under a wing. Under such circumstances, the front and rear frames respectively of the cradle are interchanged relative to the above description.

The invention claimed is:

1. An attachment structure for attaching a power plant including unducted propellers to a fuselage of an aircraft, the attachment structure being connected by a first and a second fastener means to a front spar and a rear spar, respectively, said front spar and said rear spar penetrating into the fuselage and fastened to a carrier structure of the aircraft, the attachment structure comprising:
   a central longitudinal beam having a front end connected to a first front frame arranged in a first plane containing the front spar, the central longitudinal beam having a rear end connected to a second rear frame, said second rear frame being cantilevered out from said rear spar and arranged upstream from the unducted propellers, and the central longitudinal beam having a third intermediate frame arranged in a second plane containing the rear spar, the third intermediate frame being located longitudinally between the first front frame and the second rear frame, and
   wherein the first front frame and the third intermediate frame are connected together by a first set of force-takeup beams and the third intermediate frame and the second rear frame are connected together by a second set of force-takeup beams,
   an assembly of the central longitudinal beam and the first front frame, the second rear frame, and the third intermediate frame forming a cradle for receiving the power plant via a standard attachment means.

2. An attachment structure according to claim 1, wherein the central longitudinal beam is of varying width, being wider at the front end and narrower at the rear end.

3. An attachment structure according to claim 1, wherein the first fastener means comprises two conical projections arranged on either side of a midplane of the power plant.

4. An attachment structure according to claim 1, wherein the second fastener means comprises a lug arranged in a midplane of the power plant.

5. An attachment structure according to claim 3, wherein the conical projections include flexible pads for attenuating vibration of the power plant.

6. An attachment structure according to claim 4, wherein the lug includes flexible pads for attenuating vibration of the power plant.

7. An attachment structure according to claim 1, wherein the standard attachment means for attaching the power plant to the cradle comprises at least two suspension links fastened between the power plant and the first front frame on either side of a midplane of the power plant, and a plurality of flexible pads regularly distributed between the power plant and the second rear frame.

8. An attachment structure according to claim 1, wherein the cradle presents an asymmetrical structure with said central longitudinal beam offset by a determined angle relative to a horizontal plane through a center of said power plant to compensate for an angle of inclination of the front and rear spars relative to the horizontal plane.

9. An aircraft comprising unducted propellers and at least one power plant attached to the aircraft fuselage by the attachment structure according to claim 1.

10. An attachment structure for attaching a power plant including unducted propellers to a fuselage of an aircraft, the attachment structure being connected by at least two conical projections to a front spar and by a lug to a rear spar, said front spar and said rear spar penetrating into the fuselage and fastened to a carrier structure of the aircraft, the attachment structure comprising:

a central longitudinal beam having a front end connected to a first front frame arranged in a first plane containing the front spar, the central longitudinal beam having a rear end connected to a second rear frame, said second rear frame being cantilevered out from said rear spar and arranged upstream from the unducted propellers, and the central longitudinal beam having a third intermediate frame arranged in a second plane containing the rear spar, the third intermediate from being located longitudinally between the first front frame and the second rear frame, and wherein the first front frame and the third intermediate frame are connected together by a first set of force-takeup beams and the third intermediate frame and the second rear frame are connected together by a second set of force-takeup beams, an assembly of the central longitudinal beam and the first front frame, the second rear frame, and the third intermediate frame forming a cradle for receiving the power plant via at least two suspension links fastened between the power plant and the first front frame on either side of a midplane of the power plant, and a plurality of flexible pads regularly distributed between the power plant and the second rear frame.

* * * * *